(12) United States Patent
Morishita et al.

(10) Patent No.: US 6,617,030 B2
(45) Date of Patent: Sep. 9, 2003

(54) CATIONIC ELECTRO-COATING BATH COMPOSITION

(75) Inventors: Hiroyuki Morishita, Utsunomiya (JP); Yasuyuki Hirata, Hadano (JP); Shigeo Murofushi, Atsugi (JP); Akira Tominaga, Chigasaki (JP)

(73) Assignees: Kansai Paint Co., Ltd., Hyogo-ken (JP); Honda Giken Kogvo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/094,628

(22) Filed: Mar. 12, 2002

(65) Prior Publication Data

US 2002/0198290 A1 Dec. 26, 2002

(30) Foreign Application Priority Data

Mar. 12, 2001 (JP) ........................................ 2001-068553

(51) Int. Cl.⁷ ............................................... B32B 15/08

(52) U.S. Cl. ...................... 428/418; 204/502; 204/505; 204/506; 523/404; 523/414; 523/460

(58) Field of Search .......................... 428/418; 523/404, 523/414, 460; 204/502, 505, 506

(56) References Cited

U.S. PATENT DOCUMENTS

| 5,089,542 A | | 2/1992 | Nishida et al. |
| 5,330,839 A | | 7/1994 | Yasuoka et al. |
| 6,156,823 A | * | 12/2000 | Sikora ........................ 523/415 |

FOREIGN PATENT DOCUMENTS

| EP | 0396912 | 11/1990 |
| JP | 2-265975 | 10/1990 |
| JP | 2983370 | 9/1999 |
| WO | 00/34398 | 6/2000 |

* cited by examiner

Primary Examiner—Robert Dawson
Assistant Examiner—D. Aylward
(74) Attorney, Agent, or Firm—Wenderoth, Lind & Ponack, L.L.P.

(57) ABSTRACT

This invention provides, at a low cost, a low-pollution type cationic electro-coating bath composition which contains neither lead nor chromium, and which comprises cationic electrodeposition paint and, contained therein, a bismuth oxide paste, the amount of the bismuth oxide paste being within a range of 0.1 to 0.3% by weight as metal bismuth on the basis of total solid content of said cationic electro-coating bath composition, and the bismuth oxide paste being prepared by dispersing bismuth oxide (B) in an organic acid-neutralized aqueous dispersion of diethanol amine-added alicyclic epoxy resin (A).

16 Claims, No Drawings

CATIONIC ELECTRO-COATING BATH COMPOSITION

This invention relates to a low-pollution and low-cost cationic electro-coating bath composition which contains no harmful anti-corrosive compounds such as lead and chromium.

Cationic electrodeposition paint is capable of forming a coating film which excels in corrosion resistance, coated surface smoothness, and the like. Hence, cationic electrodeposition paint has widely been employed for the coating of automobile body and its parts.

In cationic electrodeposition paint, there are often blended anticorrosive pigments, for example, lead compounds or chromium compounds such as lead chromate, basic lead silicate and strontium chromate, by which to further improve the corrosion resistance of cationic electrodeposition paint. Since these anticorrosive pigments are, however, very harmful, their use is undesirable from the viewpoint of anti-pollution policy. On this account, there has been studied the use of bismuth compound as a low-toxic or non-toxic anticorrosive pigment in place of the above-mentioned harmful anticorrosive compounds.

Bismuth compound-containing cationic electrodeposition paint has heretofore been produced by blending cationic electrodeposition emulsion with enamel paste which is obtained by the grinding and mixing of dispersion resin, bismuth hydroxide, coloring pigment or extender pigment (titanium oxide, purified clay, carbon black, etc.), organotin catalyst, neutralizer, deionized water, etc.

Bismuth compounds, in particular bismuth hydroxide or the like, have however a problem that they are comparatively expensive and accordingly raise the cost of cationic electrodeposition paint. Hence, the development of low-cost cationic electro-coating bath composition has been demanded.

The inventors of this invention assiduously studied how to achieve the above-mentioned objective, and, as a result, have now found out that, when a very small amount of bismuth oxide paste, which has been prepared by dispersing bismuth oxide in an organic acid-neutralized aqueous dispersion of diethanol amine-added alicyclic epoxy resin, is blended with a cationic electro-coating bath, the corrosion resistance of so formed coating film remarkably improves. Thus, the present invention has been completed.

This invention provides a cationic electro-coating bath composition which is characterized by comprising cationic electrodeposition paint and, contained therein, a bismuth oxide paste, the amount of the bismuth oxide paste being in an amount within a range of 0.1 to 0.3% by weight as metal bismuth on the basis of total solid content in said cationic electro-coating bath composition, and said bismuth oxide paste being prepared by dispersing bismuth oxide (B) in an organic acid-neutralized aqueous dispersion of diethanol amine-added alicyclic epoxy resin (A).

This invention is explained in more detail in the following.

Bismuth Oxide Paste

Bismuth oxide paste which is to be blended in cationic electrodeposition paint in accordance with this invention is prepared by dispersing bismuth oxide (B) in an organic acid-neutralized aqueous dispersion of diethanol amine-added alicyclic epoxy resin (A).

Diethanol amine-added alicyclic epoxy resin (A) which is used for the preparation of bismuth oxide paste includes, as an example, a dispersion resin which is obtained from a reaction of epoxy resin ($A_1$) which contains, per molecule, at least three epoxy group-containing functional groups having the following formula (1):

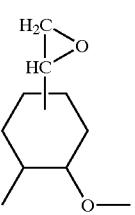

(1)

with amine compound ($A_2$) which contains diethanol amine, and phenolic compound ($A_3$) which has, per molecule, at least one phenolic hydroxyl group. An example of such a dispersion resin is mentioned in Japanese Patent Application Laid-Open (Kokai) No.Hei 2 (1990)-265975.

Epoxy resin ($A_1$) can be produced by forming the epoxy group-containing functional group having the formula (1) by means of firstly preparing a polyether resin by the ring-opening (co)polymerization reaction at epoxy group of either 4-vinylcyclohexene-1-oxide alone or 4-vinylcyclohexene-1-oxide and other epoxy group-containing compound(s) in the presence of active hydrogen-containing organic compound, as an initiator, such as alcohols, phenols, carboxylic acids, amines, thiols, polyvinyl alcohol, partial hydrolyzate of polyvinyl acetate, starch, cellulose, cellulose acetate, cellulose acetate butyrate, hydroxyethyl cellulose, allyl polyol resin, styrene-allyl alcohol copolymer resin, styrene-maleic acid copolymer resin, alkyd resin, polyester polyol resin, polycaprolactone polyol resin, and by secondly epoxidizing, with oxidizing agent such as hydroperoxide, vinyl group which exists at the side chain of thus prepared polyether resin.

There is no particular restriction on the above-mentioned other epoxy group-containing compound so long as it is a compound having epoxy group. For the sake of production, however, a compound which has one epoxy group per molecule is preferable. Concrete examples of such a compound include α-olefin epoxide such as ethylene oxide, propylene oxide and butylene oxide; oxide of unsaturated compound such as styrene oxide; allyl glycidylether, 2-ethylhexyl glycidylether, methyl glycidylether, butyl glycidylether, glycidylether of a compound having hydroxyl group such as phenyl glycidylether; and glycidyl ester of organic acid such as aliphatic carboxylic acid.

Ring-opening (co)polymerization reaction of epoxy group is preferably conducted in the presence of catalyst. Examples of catalyst include amines such as methyl amine, ethyl amine, propyl amine and piperazine; organic bases such as pyridines and imidazoles; organic acids such as formic acid, acetic acid and propionic acid; inorganic acids such as sulfuric acid and hydrochloric acid; alkali metal alcoholate such as sodium methylate; alkalis such as KOH and NaOH; Lewis acids such as $BF_3$, $ZnCl_2$, $AlCl_3$ and $SnCl_4$, or their complexes; and organic metal compounds such as triethyl aluminum and diethylzinc. These catalysts may be used in an amount of 0.001 to 10% by weight, preferably 0.1 to 5% by weight, based on reactants.

The above-mentioned ring-opening (co)polymerization reaction of epoxy group is preferably conducted at a temperature of about −70 to about 200° C. preferably about −30 to about 100° C., and with use of a solvent. As said solvent, usual organic solvent which has no active hydrogen is suitably used.

Subsequently, vinyl group which exists at the side chain of thus prepared ring-opened (co)polymer (polyether resin)

is epoxidized, and, thus, there is obtained epoxy resin ($A_1$) which has epoxy group-containing functional groups having the afore-mentioned formula (1).

Products on the market may be used as epoxy resin ($A_1$). Example of such products include EHPE-3150 (trademark of epoxy resin manufactured by Daicel Chemical Industries, Ltd.; epoxy equivalent: 180), which is produced by epoxidizing vinyl group in ring-opened polymer of 4-vinylcyclohexene-1-oxide. This EHPE-3150 has a polymerization degree of 15 to 25 on average.

Epoxy resin ($A_1$) is required to contain, per molecule, at least three epoxy group-containing functional groups having the formula (1). Generally, however, epoxy resin ($A_1$) preferably contains epoxy group-containing functional groups of formula (1) in an amount corresponding to epoxy equivalent in the range of 140 to 1,000, especially 150 to 600, much desirably 170 to 300.

As amine compound ($A_2$), diethanol amine may be used either solely or in combination with the following compounds:

(i) primary alkanol amine such as monoethanol amine, monopropanol amine and monobutanol amine;

(ii) secondary alkanol amine such as N-methylethanol amine, N-ethylethanol amine, di-n or iso-propanol amine and dibutanol amine;

(iii) adduct (secondary alkanol amine) of the above-mentioned primary alkanol amine with α,β-unsaturated carbonyl compound such as an adduct of monoethanol amine with N,N-dimethylaminopropyl acrylamide; an adduct of monoethanol amine with hydroxyethyl (meth)acrylate; an adduct of monoethanol amine with hydroxypropyl (meth)acrylate; and an adduct of monoethanol amine with hydroxybutyl (meth)acrylate;

(iv) product from a reaction between primary or secondary alkanol amine such as hydroxyethylamino ethylamine with monocarboxylic acid, e.g., amine compound of the following formula (2):

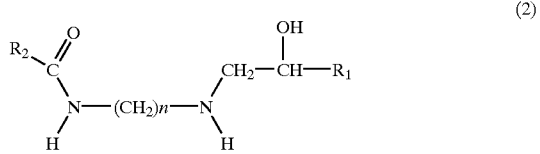

(2)

[wherein n denotes an integer of 1 to 6, in particular 2 to 3; $R_1$ denotes a hydrogen atom or an alkyl group having 1 to 2 carbon atoms; $R_2$ denotes a hydrocarbon group having 4 to 36 carbon atoms which may have hydroxyl group and/or polymerizable unsaturated group, such as oleyl group and stearyl group].

In a reaction between epoxy resin ($A_1$) and amine compound ($A_2$), a cationizing agent other than said amine compound ($A_2$) may be used together where necessary. Examples of such a cationizing agent include dimethylamino ethanol/lactic acid, thioglycol/acetic acid and N-hydroxyethylimidazoline compound.

Preferable examples of phenolic compound ($A_3$) which has at least one phenolic hydroxyl group include alkylphenols such as nonyl phenol, octyl phenol and p-t-butylphenol; bisphenols such as bisphenol A [bis(4-hydroxyphenyl)-2,2-propane] and bisphenol F [bis(4-hydroxyphenyl)-2,2-methane]; or compounds prepared from the polyaddition of diglycidylether thereto.

Preferable ones among the above-mentioned phenolic compound ($A_3$) are those which have a number average molecular weight of at least 200, preferably about 800 to about 3,000, much desirably about 1,000 to about 1,500, and which have, on average, at most two, suitably one, phenolic hydroxyl group, per molecule.

The reaction of the above-mentioned epoxy resin ($A_1$), amine compound ($A_2$) and phenolic compound ($A_3$) may be carried out at a temperature of about 50 to about 300° C., preferably about 70 to about 200° C.

The order of reaction among said epoxy resin ($A_1$), amine compound ($A_2$) and phenolic compound ($A_3$) is not in particular restricted. The three of them may react simultaneously. It is also acceptable that epoxy resin ($A_1$) reacts with phenolic compound ($A_3$) in the first place, and that, secondly, thus obtained reaction product reacts with amine compound ($A_2$). Whichever reaction gives the desired diethanol amine-added alicyclic epoxy resin (A).

The proportion in use of amine compound ($A_2$) and phenolic compound ($A_3$) to epoxy resin ($A_1$) is not strictly restricted. Generally, however, amine compound ($A_2$) is preferably used in an amount of 0.6 to 0.98 equivalent, in particular 0.7 to 0.9 equivalent, per mole of epoxy group-containing functional group in epoxy resin ($A_1$), and phenolic compound ($A_3$) is preferably used in an amount of 0.02 to 0.4 equivalent, in particular 0.1 to 0.3 equivalent, per mole of epoxy group-containing functional group in epoxy resin ($A_1$).

Thus obtained diethanol amine-added alicyclic epoxy resin (A) can be rendered water-dispersible by neutralization with an organic acid. Preferable examples of organic acid which is usable for this neutralization include water-soluble organic acid such as acetic acid, formic acid, lactic acid, propionic acid, hydroxyacetic acid, methoxyacetic acid, amidosulfonic acid and sulfamic acid, more desirably at least one carboxylic acid selected from acetic acid, formic acid and lactic acid.

Preferable neutralization equivalent is generally 0.5 to 2.0 equivalents, desirably 0.8 to 1.2 equivalents, on the basis of amino group in the above-mentioned epoxy resin (A).

Examples of bismuth oxide (B) include bismuth oxide (I): BiO, bismuth oxide (III): $Bi_2O_3$ and bismuth oxide (V): $Bi_2O_5$. In this invention, however, bismuth oxide (III): $Bi_2O_3$ is preferably used from the viewpoint of safety and cost.

When used solely, bismuth oxide (B) is generally hard to be dispersed uniformly and finely in cationic electro-coating bath and in coating film. When combined with the afore-mentioned diethanol amine-added alicyclic epoxy resin (A) in accordance with this invention, however, bismuth oxide (B) can be dispersed uniformly and finely in cationic electro-coating bath composition and in a coating film formed therefrom, and, resultantly, is brought into contact more frequently with corrosive matter (e.g., $H_2O$, $O_2$, $Cl^-$) which penetrates the coating film, and, thus, even in a small amount, comes to contribute greatly to the improvement of corrosion resistance.

Bismuth oxide paste can be prepared by dispersing bismuth oxide (B) in an organic acid-neutralized aqueous dispersion of diethanol amine-added alicyclic epoxy resin (A).

The blending proportion of bismuth oxide (B) to diethanol amine-added alicyclic epoxy resin (A) is not strictly restricted. Generally, however, 10 to 200 parts by weight, in particular 20 to 100 parts by weight, of bismuth oxide (B) is suitably blended per 100 parts by weight (as solid content) of diethanol amine-added alicyclic epoxy resin (A).

In a method which can be mentioned as an example of how to prepare bismuth oxide paste, diethanol amine-added alicyclic epoxy resin (A) is mixed with bismuth oxide (B), and, to the resultant mixture, the afore-mentioned organic acid is added in an amount corresponding to the above-mentioned neutralization equivalent by which to neutralize epoxy resin (A), and, then, water is added where necessary, and, thus, the resultant mixture is treated with a grinding mill. Examples of grinding mill include ball mill, pebble mill, sand mill and shaker which have conventionally been employed, among which ball mill is preferable in view of workability. Dispersing time by ball mill is usually 1 to 96 hours, preferably 10 to 48 hours, from the viewpoint of particle size of pigment and manufacturing man-hour.

The solid content of bismuth oxide paste is not strictly restricted. Usually, however, it is within a range of 20 to 60% by weight, preferably 25 to 50% by weight. When the solid content of bismuth oxide paste is less than 20% by weight, bismuth oxide is apt to settle, while, when the solid content exceeds 60% by weight, bismuth oxide paste tends to have too high a viscosity.

Thus prepared bismuth oxide paste may be blended directly in cationic electrodeposition paint, or may be blended in the form of a pigment dispersion paste which is prepared by dispersing bismuth oxide paste together with synthetic hydrotalcites (C) mentioned later and/or other pigments.

Examples of said other pigments which are used for the preparation of this pigment dispersion paste include coloring pigments such as titanium oxide, carbon black and blood red; extender pigments such as clay, mica, baryta, talc, calcium carbonate and silica; and anticorrosion pigments such as aluminum phosphomolybdate and aluminum tripolyphosphate. Said pigment dispersion paste may further contain, under circumstances, organotin compound such as dibutyltin oxide (DBTO) and dioctyltin oxide (DOTO), or quaternary ammonium type epoxy dispersion resin.

In addition to the afore-mentioned components, there are further added surfactant, neutralizer and water where necessary, and the resultant mixture is dispersed by a ball mill or the like, and, thus, a pigment dispersion paste is produced.

Synthetic Hydrotalcites

In addition to the above-mentioned bismuth oxide paste, synthetic hydrotalcites (C) may be blended in the cationic electro-coating bath composition of this invention.

As an example of synthetic hydrotalcites (C) usable in this invention, there can be mentioned a hydrotalcite having the following formula (3):

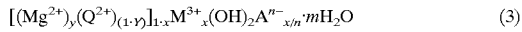  (3)

wherein $Q^{2+}$ denotes at least one species of divalent metal ion selected from the group consisting of $Zn^{2+}$, $Ca^{2+}$ and $Sr^{2+}$, $Zn^{2+}$ being in particular preferable;

$M^{3+}$ denotes trivalent metal ion such as $Al^{3+}$ and $Fe^{3+}$, $Al^{3+}$ being in particular preferable;

$A^{n-}$ denotes n-valent anion such as $I^-$, $OH^-$, $HCO_3^-$, $CO_3^{2-}$, salicylate ion, $(OOC-COO)^{2-}$, $[Fe(CN)6]^{4-}$ and $ClO^{4-}$; and x, y and m are each a number which satisfies the following inequality:

$0<x\leq 0.5$, preferably $0.2\leq x\leq 0.5$,
more desirably $0.2<x<0.4$,
$0<y<1$,
$0\leq m<2$.

Synthetic hydrotalcites having the above-mentioned formula (3) have alkaline OH, and accordingly have metal corrosion-inhibiting effects, and, thus, contribute to the improvement of coating film in corrosion resistance, and, furthermore, enhance the adhesion between coating film and substrate metal and thereby effectively prevent corrosive matters such as air and water from penetrating the interface between metal and coating film.

Synthetic hydrotalcites (C) of formula (3) can be manufactured by any known method except that components of $Mg^{2+}$ and $Q^{2+}$ are to be used.

Such known methods are mentioned, for instance, in U.S. Pat. No. 3,539,306, German Patent 1,185,920, French Patent 1,532,167, U.S. Pat. No. 3,796,792, German Patent 2,061,156, French Patent 2,081,349, Japanese Patent Publication (Kokoku) No.Sho 48 (1973)-29477 and Japanese Patent Publication (Kokoku) No.Sho 51 (1976)-29129.

Cationic Electrodeposition Paint

There is no particular restriction on cationic electrodeposition paint in which bismuth oxide paste and, under circumstances, synthetic hydrotalcites (C) as well are blended in accordance with this invention. Any cationic electrodeposition paint is usable so long as it contains, as basic component, a base resin and, under circumstances, a curing agent as well.

Examples of said base resin include epoxy resins, acrylic resins and polyurethane resins, among which polyamine resins which are represented by amine-added epoxy resins are especially preferred.

Examples of the above-mentioned amine-added epoxy resin include (1) an adduct of polyepoxide compound with primary mono- and polyamine, secondary mono- and polyamine, or with primary and secondary mixed polyamines (see: U.S. Pat. No. 3,984,299); (2) an adduct of polyepoxide compound with secondary mono- and polyamine having ketiminized primary amino group (see: U.S. Pat. No. 4,017,438); (3) a product from etherification reaction between polyepoxide resin and a hydroxyl compound having ketiminized primary amino group [see: Japanese Patent Application Laid-Open (Kokai) No. Sho 59 (1984)-43013].

The polyepoxide compound used for the production of the above-mentioned amine-added epoxy resin is a compound which has at least two epoxy groups per molecule, and which generally has a number average molecular weight within a range of at least 200, preferably 400 to 4,000, more desirably 800 to 2,000, and which suitably has an epoxy equivalent within a range of at least 100, preferably 200 to 2,000, further desirably 400 to 1,000. In particular preferable is a compound obtained from a reaction between polyphenol compound and epichlorohydrin.

Examples of polyphenol compound used for the formation of said polyepoxide compound include bis(4-hydroxyphenyl)-2,2-propane; 4,4-dihydroxybenzophenone;
bis(4-hydroxyphenyl)-1,1-ethane;
bis(4-hydroxyphenyl)-1,1-isobutane;
bis(4-hydroxy-tert-butyl-phenyl)-2,2-propane;
bis(2-hydroxynaphthyl)methane; 1,5-dihydroxynaphthalene;
bis(2,4-dihydroxyphenyl)methane;
tetra(4-hydroxyphenyl)-1,1,2,2-ethane;
4,4-dihydroxydiphenylsulfone; phenolic novolak; and cresol novolak.

Said epoxide compound may be a product of partial reaction with polyol, polyetherpolyol, polyesterpolyol, polyamide amine, polycarboxylic acid or polyisocyanate compound, or may be a product of graft polymerization of ε-caprolactone, acryl monomer, etc.

The above-mentioned base resin may be either of externally crosslinked type or of internally (self) crosslinked type. As a curing agent which is used for an externally crosslinked type resin, any known one may be employed such as blocked polyisocyante compound, amino resin, etc., among which blocked polyisocyante compound is especially preferred. Said internally crosslinked type resin has preferably blocked-isocyante groups introduced therein.

Blocked polyisocyanate compounds usable with the above-mentioned externally crosslinked type resin are products of addition reaction between polyisocyanate compounds and blocking agents. Examples of said polyisocyanate compound include aromatic, aliphatic or alicyclic polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate and isophorone diisocyanate, and further include isocyanate-terminated compounds obtained from the reaction between an excess amount of said isocyanate compound and a low molecular active-hydrogen-containing compound such as ethylene glycol, propylene glycol, trimethylol propane, hexane triol or polycaprolactone diol.

The above-mentioned blocking agent is a compound which attaches to, and thereby blocks, isocyanate groups of polyisocyanate compound. Blocked polyisocyanate compound which is formed by addition is stable at a normal temperature, and is preferably capable of reproducing free isocyanate groups by dissociating the blocking agent when heated to a baking temperature of coating film of about 100 to about 200° C., desirably about 140 to about 180° C. Examples of blocking agent which satisfies such requirements include lactam compound such as $\epsilon$-caprolactam and $\gamma$-butyrolactam, etc.; oxime compound such as methylethyl ketoxime and cyclohexanone oxime, etc.; phenolic compound such as phenol, para-t-butylphenol and cresol, etc.; aliphatic alcohols such as n-butanol and 2-ethylhexanol, etc.; aromatic alkylalcohols such as phenylcarbinol and methylphenylcarbinol, etc.; and etheralcohol compounds such as ethylene glycol monobutyl ether etc. Among these compounds, oxime type and lactam type blocking agents, which dissociate at a considerably low temperature, are in particular preferable in view of low temperature curability of cationic electrodeposition paint.

The introduction of blocked isocyanate group into a base resin, which has blocked isocyanate groups in its molecule and thereby self-crosslinks, may be conducted by any known method. For instance, said introduction is achieved by making free isocyanate group in partially blocked polyisocyanate compounds react with active hydrogen-containing site of base resin.

Cationic electrodeposition paint can be prepared from the above-mentioned base resin and curing agent by any known method, for instance, by adding, if necessary, a curing agent to base resin, and by neutralizing base resin with organic acid such as formic acid, acetic acid and lactic acid, and thus rendering the base resin water-soluble or water-dispersible. Where appropriate, there may further be added organic solvent, surface conditioner and an organic solvent solution of organotin compound such as dibutyl tin laurate, dioctyl tin dilaurate, dibutyl tin diacetate, dioctyl tin benzoate oxy, dibutyl tin benzoate oxy, dioctyl tin dibenzoate and dibutyl tin dibenzoate.

Cationic Electro-coating Bath Composition

Cationic electro-coating bath composition of the present invention is prepared by blending the above-mentioned cationic electrodeposition paint with the above-mentioned bismuth oxide paste together with, under circumstances, synthetic hydrotalcites (C).

The blending amount of bismuth oxide paste may be within a range of 0.1 to 0.3% by weight, in particular 0.2 to 0.3% by weight, as metal bismuth, on the basis of the total solid content of cationic electro-coating bath composition. When the amount of metal bismuth in cationic electro-coating bath composition is less than 0.1% by weight, anti-corrosion effect is insufficient, while, when it exceeds 0.3% by weight, cost rises undesirably.

The blending amount of synthetic hydrotalcites (C) may usually be within a range of 0 to 2% by weight, in particular 0.8 to 1.7% by weight, much desirably 1.0 to 1.6% by weight, on the basis of the total solid content of cationic electro-coating bath composition. When the amount of synthetic hydrotalcites (C) in cationic electro-coating bath composition exceeds 2% by weight, the appearance of cationic electro-coating film may possibly decrease.

Electrodeposition coating of substrate such as automobile body or its parts with the cationic electro-coating bath composition of the present invention may be conducted by any known method. In an instance of such a method, the cationic electro-coating bath composition of the present invention is diluted with deionized water or the like so that the solid content may be about 5 to 40% by weight, preferably 15 to 25% by weight, and is adjusted so that the pH may fall within the range of 5.5 to 9.0, and, thus, substrate as a cathode is subjected to electrodeposition coating under a condition of bath temperature of 15 to 35° C. and applied voltage of 100 to 400 V.

The thickness of cationic electro-coating film is not restricted in particular. Generally, however, preferred thickness is within a range of 5 to 50 $\mu$m, desirably 10 to 40 $\mu$m, on the basis of cured coating film. Preferable baking and curing temperature of coating films is generally in the range of about 100 to about 200° C., desirably about 140 to about 180° C. Baking time is usually 5 to 60 minutes, preferably 10 to 30 minutes.

As stated above, when a bismuth oxide paste which is prepared by the dispersing of bismuth oxide (B) in an organic acid-neutralized aqueous dispersion of diethanol amine-added alicyclic epoxy resin (A) is blended with a cationic electro-coating bath composition according to this invention, there is provided, at low cost, a non-toxic cationic electrodeposition paint which contains no harmful metal such as lead and chromium.

Corrosion resistance is expected to increase further when synthetic hydrotalcites (C) are blended with cationic electro-coating bath composition.

In the following, this invention is explained in more detail by means of working examples, which do not, however, restrict the scope of this invention. Incidentally, both "parts" and "%" are based on weight.

Production Example of Diethanol Amine-added Alicyclic Epoxy Resin

A flask equipped with stirrer, thermometer, dropping funnel and reflux condenser was fed with 398 parts of ethyleneglycol monobutylether, 900 parts of EHPE-3150 (trademark of alicyclic epoxy resin manufactured by Daicel Chemical Industries, Ltd.; epoxy equivalent: 180), 315 parts of diethanolamine, 371 parts of amine compound (Note 1) and 1,651 parts of phenolic compound (Note 2), and, then, the resulting mixture was gradually heated with mixing and stirring, and, thus, was allowed to react at 150° C. When it was confirmed that epoxy equivalent was zero, there was obtained diethanol amine-added alicyclic epoxy resin having an amine value of 96.5.

(Note 1) Amine compound: amino compound having an amine value of 150 and a solidifying point of 76° C. which is produced as follows. A reactor equipped with thermometer, stirrer, reflux condenser and water separator was fed with 285 parts of stearic acid, 104 parts of hydroxyethylaminoethylamine and 80 parts of toluene, and, then, the resulting mixture was gradually heated with mixing and stirring. Toluene was removed where necessary, and 18 parts of reaction water was separated and removed while temperature was being raised, and, then, remaining toluene was removed under reduced pressure, and, thus, the desired amino compound was obtained.

(Note 2) Phenolic compound: A flask equipped with stirrer, thermometer, dropping funnel and reflux condenser was fed with 105 parts of diethanolamine, 760 parts of bisphenol A diglycidylether having an epoxy equivalent of 190, 456 parts of bisphenol A and 330 parts of ethyleneglycol monobutylether, and, then, the resulting mixture was allowed to react at 150° C. until the amount of remaining epoxy group became zero, and, thus, there was obtained the desired phenolic compound having a solid content of 80%.

Production Example of Bismuth Oxide Paste A

To 1.82 parts (solid content: 1.0 part) of the above-mentioned diethanol amine-added alicyclic epoxy resin, there were added 0.45 part of bismuth oxide (III), 0.06 part of neutralizer and 1.3 parts of deionized water, and the resultant mixture was dispersed in a ball mill for 20 hours, and, then, was discharged, and, thus, there was obtained bismuth oxide paste A having a solid content of 40% as shown in Table 1.

Production Example of Bismuth Oxide Paste B

Bismuth oxide paste B having a solid content of 40% as shown in Table 1 was obtained in the same manner as in the case of bismuth oxide paste A.

TABLE 1

Formulation of bismuth oxide paste

| Formulation | A | B |
|---|---|---|
| Diethanol amine-added alicyclic epoxy resin type dispersion resin | 1.82 (1.0) | 1.82 (1.0) |
| Bismuth oxide (III) | 0.45 | 0.41 |
| Neutralizer | 0.06 | 0.06 |
| Deionized water | 1.30 | 1.24 |
| 40% Bismuth oxide paste | 3.63 (1.45) | 3.53 (1.41) |

Parenthetical value means a solid content.

Production Example of Pigment Dispersion Paste No. 1 to No. 4

Bismuth oxide paste A or B which had been produced according to the above-mentioned formulation was blended with other components by the formulation as shown in Table 2 below, and, thus, pigment dispersion paste No. 1 and No. 2 were obtained. On the other hand, dispersion resin and other pigments were added to bismuth oxide or ZHT-7A (Note 3), and the resultant mixture was dispersed in a ball mill, and, thus, bismuth oxide paste No. 3 and No. 4 were obtained.

TABLE 2

Formulation of pigment dispersion paste

| Formulation | No. 1 | No. 2 | No. 3 | No. 4 |
|---|---|---|---|---|
| 40% Bismuth oxide paste A | 3.63 | | | |
| (bismuth oxide: 0.45 part) | (1.45) | | | |
| 40% Bismuth oxide paste B | | 3.53 | | |
| (bismuth oxide: 0.41 part) | | (1.41) | | |
| Quaternary ammoniuim salt | 6.67 | 6.67 | 8.33 | 8.33 |
| epoxy type dispersion resin | (4.0) | (4.0) | (5) | (5) |
| Titanium oxide | 14.5 | 14.5 | 14.5 | 14.5 |
| Purified clay | 7 | 7 | 7 | 7 |
| Carbon black | 0.4 | 0.4 | 0.4 | 0.4 |
| Organotin | 1 | 1 | 1 | 1 |
| Bismuth oxide (III) | — | — | 0.404 | — |
| ZHT-7A (Note 3) | — | 1.79 | — | 1.79 |

TABLE 2-continued

Formulation of pigment dispersion paste

| Formulation | No. 1 | No. 2 | No. 3 | No. 4 |
|---|---|---|---|---|
| Deionized water | 18.3 | 19.8 | 19.82 | 20.98 |
| 55% Pigment dispersion paste | 51.5 (28.4) | 54.7 (30.1) | 51.5 (28.3) | 54.0 (29.7) |

Parenthetical value means a solid content.
Note 3: ZHT-7A Trademark of synthetic hydrotalcite manufactured by Kyowa Chemical Industries, Ltd.

Production Example of Base Resin for Cationic Electrodeposition

To 1010 parts of Epikote 828EL (tradename of epoxy resin manufactured by Japan Epoxy Resin Co., Ltd.), there were added 390 parts of bisphenol A and 0.2 part of dimethylbenzylamine, and the resultant mixture was allowed to react at 130° C. until epoxy equivalent became 800. Then, 260 parts of ε-caprolactone and 0.03 part of tetrabutoxy titanium were added, and the temperature was raised to 170° C. Sampling was conducted with time at this temperature maintained, and the amount of unreacted ε-caprolactone was monitored by infrared absorption spectrum measurement. When the reaction rate became 98% or more, the reaction mixture was cooled to 120° C. Next, 160 parts of diethanolamine and 65 parts of methylisobutyldiketiminized diethylenetriamine were added, and the resultant mixture was allowed to react at 120° C. for 4 hours. Thereafter, 420 parts of butyl cellosolve was added, and, thus, there was obtained an amine-added type epoxy resin having an amine value of 58 and a solid content of 80%.

Production Example of Emulsion for Cationic Electrodeposition

There were blended 87.5 parts (solid content: 70 parts) of amine-added type epoxy resin which had been obtained in the above-mentioned production example, 33.3 parts (solid content: 30 parts) of cellosolve-blocked 4,4'(E-diphenylmethane diisocyanate (MDI) as a curing agent, 2.5 parts (solid content: 1 part) of liquid organotin compound and 15 parts of 10% acetic acid. The resulting mixture was stirred uniformly, and, then, 156 parts of deionized water was added dropwise over about 15 minutes with vigorous stirring, and, thus, there was obtained a clear emulsion for cationic electrodeposition having a solid content of 34.0%.

EXAMPLE 1

To 328.4 parts (solid content: 111.65 parts) of clear emulsion for cationic electrodeposition, there were added 51.5 parts (solid content: 28.4 parts) of pigment dispersion paste No. 1 and 320.1 parts of deionized water, and, thus, cationic electro-coating bath composition No. 1 having a solid content of 20% was obtained. Cationic electro-coating bath composition No. 1 had a metal bismuth content of 0.29%.

EXAMPLE 2 AND COMPARATIVE EXAMPLES 1 AND 2

In the same manner as in Example 1, cationic electro-coating bath compositions No. 1 to No. 4 each having a solid content of 20% were obtained by the formulation as shown in Table 3 below.

TABLE 3

Formulation of cationic electro-coating bath composition

| Cationic electro-coating bath composition | | No. 1 | No. 2 | No. 3 | No. 4 |
|---|---|---|---|---|---|
| Formulation | 34% Emulsion for cationic electrodeposition | 328.4 (111.65) | 323.3 (109.91) | 328.5 (111.7) | 324.4 (110.31) |
| | 55% Pigment dispersion paste | No. 1 51.5 (28.4) | No. 2 54.7 (30.1) | No. 3 51.5 (28.3) | No. 4 54.0 (29.7) |
| | Deionized water | 320.1 | 322.0 | 320.1 | 321.6 |
| | 20% Cationic electrocoating bath composition | 700.0 (140.0) | 700.0 (140.0) | 700.0 (140.0) | 700.0 (140.0) |
| Concentration in bath | Amount of bismuth from Bismuth oxide (%) | 0.29 | 0.26 | 0.26 | 0 |
| | AHT-7A (%) | 0 | 1.28 | 0 | 1.28 |

Parenthetical value means a solid content.

Preparation of Test Plate

Cold-rolled steel plate (0.8 mm×150 mm×70 mm) which had been chemically treated with Palbond #3020 (trade name of zinc phosphate treating agent made by Nihon Parkerizing Company) was dipped in each of cationic electro-coating bath compositions obtained in the above-mentioned Examples and Comparative Examples, and, then, electrodeposition coating was conducted by using the plate as cathode. Thus formed electrodeposition coating film was baked at 175° C. for 20 minutes by using an electric hot air drier. Results of performance test on the obtained coated plates are shown in the following Table 4. Performance tests were conducted by methods which are mentioned in notes below.

TABLE 4

Test results

| Test item | Example 1 | Example 2 | Comparative Example 1 | Comparative Example 2 |
|---|---|---|---|---|
| Cationic electro-coating bath composition | No. 1 | No. 2 | No. 3 | No. 4 |
| Salt spray Resistance (Note 4) | ⊚ | ⊚ | ⊚ | ◯ |
| CCT (Note 5) | ⊚ | ⊚ | Δ | Δ |
| Warm salt water resistance (Note 6) | ⊚ | ⊚ | ◯ | Δ |

(Note 4) Salt spray resistance:
Cross-cut lines were made with a knife on the electrodeposition coating film of each of the above-mentioned test plates so that knife cut might reach the substrate. Thus treated test plates were subjected to salt water spray test according to JIS Z-2371 for 960 hours, and were then evaluated by the rust and blister width from the knife scratch by the following criteria.
⊚: Maximum width of rust or blister is less than 1.5 mm on each side from the cut, and there is no occurrence of rust, blister, peeling or the like except within 1.5 mm on each side from the cut.
◯: Maximum width of rust or blister is 1.5 mm or more and less than 2 mm on each side from the cut, and there is no occurrence of rust, blister, peeling or the like except within 2 mm on each side from the cut.
Δ: Maximum width of rust or blister is 2 mm or more and less than 3 mm on each side from the cut, and blister is quite conspicuous on the surface other than within 2 mm on each side from the cut.
x: Maximum width of rust or blister is 3 mm or more from the cut, and blister is observed all over the coated surface.

TABLE 4-continued

Test results

| Test item | Example 1 | Example 2 | Comparative Example 1 | Comparative Example 2 |
|---|---|---|---|---|

(Note 5) CCT:
Cross-cut lines were made with a knife on the electrodeposition coating film of each of the above-mentioned test plates so that knife cut might reach the substrate. Thus treated test plates were placed under the following cyclic condition 50 times, and were then evaluated by the following criteria.
[Cyclic condition: Hot air drying (50° C.) 3 hours - Salt water spraying 6 hours - Cold air blast (R.T.) 1 hour - Wetting (50° C.; RH: 95%) 14 hours]
⊚: Maximum width of rust or blister is less than 2.5 mm on each side from the cut, and there is no occurrence of rust, blister, peeling or the like except within 2.5 mm on each side from the cut.
◯: Maximum width of rust or blister is 2.5 mm or more and less than 3.5 mm on each side from the cut, and there is no occurrence of rust, blister, peeling or the like except within 3.5 mm on each side from the cut.
Δ: Maximum width of rust or blister is 3.5 mm or more and less than 4.5 mm on each side from the cut, and blister is quite conspicuous on the surface other than within 4.5 mm on one side from the cut.
x: Maximum width of rust or blister is 4.5 mm or more from the cut, and blister is observed all over the coated surface.
(Note 6) Warm salt water resistance:
Cross-cut lines were made with a knife on each of the test plates which had been prepared in Examples and Comparative Examples. Thus treated test plates were dipped in 5% salt water at 55° C. for 10 days, and were then evaluated by the following criteria.
⊚: Maximum width of rust or blister is less than 1.5 mm on each side from the cut.
◯: Maximum width of rust or blister is 1.5 mm or more and less than 2.5 mm on each side from the cut.
Δ: Maximum width of rust or blister is 2.5 mm or more and less than 3.5 mm on each side from the cut.
x: Maximum width of rust or blister is 3.5 mm or more on each side from the cut.

What is claimed is:

1. A cationic electro-coating bath composition which comprises a cationic electrodeposition paint and, contains therein, a bismuth oxide paste, the amount of the bismuth oxide paste being within a range of 0.1 to 0.3% by weight as metal bismuth on the basis of total solid content of said cationic electro-coating bath composition, and the bismuth oxide paste being prepared by dispersing a bismuth oxide (B) in an organic acid-neutralized aqueous dispersion of a diethanol amine-added alicyclic epoxy resin (A) which is a resin which is obtained from a reaction of epoxy resin ($A_1$) which contains, per molecule, at least three epoxy group-containing functional groups having the following formula (1):

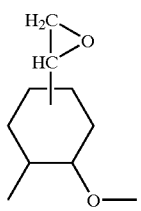

(1)

with amine compound ($A_2$) which contains diethanol amine, and phenolic compound ($A_3$) which has, per molecule, at least one phenolic hydroxyl group.

2. A cationic electro-coating bath composition of claim 1 wherein epoxy resin ($A_1$) contains epoxy group-containing functional groups of formula (1) in an amount corresponding to epoxy equivalent of 140 to 1,000.

3. A cationic electro-coating bath composition of claim 1 wherein amine compound ($A_2$) consists of diethanol amine alone.

4. A cationic electro-coating bath composition of claim 1 wherein amine compound (A2) comprises a combination of diethanol amine with primary alkanol amine, secondary alkanol amine, and adduct of primary alkanol amine with α,β-unsaturated carbonyl compound or a product from a reaction between primary or secondary alkanol amine with monocarboxylic acid.

5. A cationic electro-coating bath composition of claim 1 wherein phenolic compound ($A_3$) is selected from the group consisting of alkylphenols, bisphenols and products prepared from the polyaddition of diglycidylether to bisphenols.

6. A cationic electro-coating bath composition of claim 1 wherein phenolic compound ($A_3$) has a number average molecular weight of about 800 to about 3,000, and has, on average, one phenolic hydroxyl group per molecule.

7. A cationic electro-coating bath composition of claim 1 wherein bismuth oxide (B) is selected from the group consisting of bismuth oxide (I), bismuth oxide (III) and bismuth oxide (V).

8. A cationic electro-coating bath composition of claim 1 wherein bismuth oxide (B) is bismuth oxide (III).

9. A cationic electro-coating bath composition of claim 1 wherein bismuth oxide paste contains 10 to 200 parts by weight of bismuth oxide (B) per 100 parts by weight (as solid content) of diethanol amine-added alicyclic epoxy resin (A).

10. A cationic electro-coating bath composition of claim 1 wherein bismuth oxide paste has a solid content of 20 to 60% by weight.

11. A cationic electro-coating bath composition of claim 1 which further comprises synthetic hydrotalcites (C) in an amount of 0.8 to 1.7% by weight based on the total solid content of cationic electro-coating bath composition.

12. A cationic electro-coating bath composition of claim 11 wherein synthetic hydrotalcites (C) has a structure of the following formula (3):

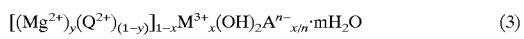

(3)

wherein $Q^{2+}$ denotes at least one species of divalent metal ion selected from the group consisting of $Zn^{2+}$, $CA^{2+}$ and $Sr^{2+}$;

$M^{3+}$ denotes trivalent metal ion such as $Al^{3+}$ and $Fe^{3+}$;

$A^{n-}$ denotes n-valent anion; and x, y and m are each a number which satisfies the following inequality:

$0 < x \leq 0.5$, $0 < y < 1$, $0 \leq m < 2$.

13. A cationic electro-coating bath composition of claim 1 which contains bismuth oxide paste in an amount of 0.2 to 0.3% by weight as metal bismuth, based on the total solid content of cationic electro-coating bath composition.

14. A cationic electro-coating bath composition of claim 11 which contains synthetic hydrotalcites (C) in an amount of 1.0 to 1.6% by weight on the basis of the total solid content of cationic electro-coating bath composition.

15. A process for cationic electrocoating application which is characterized by the use of cationic electro-coating bath composition of claim 1.

16. An article which has been coated with cationic electro-coating bath composition of claim 1.

* * * * *